(12) United States Patent
Ogawa

(10) Patent No.: US 12,744,857 B2
(45) Date of Patent: Sep. 22, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Masahiro Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,204

(22) Filed: Mar. 23, 2023

(65) Prior Publication Data

US 2024/0089398 A1 Mar. 14, 2024

(30) Foreign Application Priority Data

Sep. 13, 2022 (JP) ................................ 2022-145202

(51) Int. Cl.
*H04N 1/60* (2006.01)
*H04N 1/00* (2006.01)

(52) U.S. Cl.
CPC ....... *H04N 1/6027* (2013.01); *H04N 1/00795* (2013.01); *H04N 2201/0084* (2013.01)

(58) Field of Classification Search
CPC .... H04N 1/4072; H04N 1/19594; H04N 1/60; H04N 1/00251; H04N 1/00997; H04N 1/6005
See application file for complete search history.

(56) References Cited

U.S. PATENT DOCUMENTS

| | | | | |
|---|---|---|---|---|
| 9,876,927 | B2 * | 1/2018 | Osawa | H04N 1/00551 |
| 2005/0030415 | A1 * | 2/2005 | Takizawa | H04N 23/71 348/E5.035 |
| 2010/0100813 | A1 * | 4/2010 | Saito | G06F 40/103 715/255 |
| 2011/0285873 | A1 * | 11/2011 | Showering | G06V 30/18076 382/190 |
| 2012/0301034 | A1 * | 11/2012 | Fukunaga | H04N 1/4072 348/E5.078 |
| 2013/0215480 | A1 * | 8/2013 | Iwayama | H04N 1/04 358/475 |

(Continued)

FOREIGN PATENT DOCUMENTS

| | | |
|---|---|---|
| JP | H07104383 | 4/1995 |
| JP | H07135602 | 5/1995 |

(Continued)

OTHER PUBLICATIONS

Search Report of European Counterpart Application, issued on Feb. 8, 2024, p. 1-p. 9.

(Continued)

*Primary Examiner* — Akwasi M Sarpong
*Assistant Examiner* — Michael L Burleson
(74) *Attorney, Agent, or Firm* — JCIPRNET

(57) ABSTRACT

An information processing apparatus includes a processor configured to perform brightness correction with an image area that satisfies a predetermined condition in a document image of a captured image of an installation area where a document is installed, as a processing target area.

11 Claims, 6 Drawing Sheets

(56) References Cited

U.S. PATENT DOCUMENTS

| | | | | |
|---|---|---|---|---|
| 2013/0329073 | A1* | 12/2013 | Majewicz | G06V 10/141 348/222.1 |
| 2015/0163376 | A1* | 6/2015 | Pan | H04N 1/4072 358/461 |
| 2016/0350582 | A1* | 12/2016 | Ueda | G06V 40/166 |
| 2018/0249044 | A1* | 8/2018 | Ikari | H04N 1/4095 |
| 2020/0275065 | A1* | 8/2020 | Murasawa | H04N 9/646 |

FOREIGN PATENT DOCUMENTS

| | | |
|---|---|---|
| JP | 2011139332 | 7/2011 |
| JP | 2012175166 | 9/2012 |

OTHER PUBLICATIONS

"Notice of Reasons for Refusal of Japan Counterpart Application", issued on Jul. 14, 2026, with English translation thereof, p. 1-p. 9.

* cited by examiner

10
IMAGE FORMING APPARATUST
11 CPU
12 MEMORY
14 INPUT UNIT
15 DISPLAY UNIT
40
70 DOCUMENT CAMERA
16 R/W
17
13 STORAGE UNIT
13A INFORMATION PROCESSING PROGRAM
⋮
18 COMMUNICATION I/F UNIT
B

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-145202 filed Sep. 13, 2022.

BACKGROUND

(i) Technical Field

The present disclosure relates to an information processing apparatus, a non-transitory computer readable medium storing an information processing program, and an information processing method.

(ii) Related Art

In the related art, there has been the following technique as a technique for suppressing deterioration of image quality due to the influence of light.

JP1995-104383A discloses a platen for preventing a document or the like from blocking an imaging luminous flux and preventing stray light or the like in a case where the document is placed on a document table.

The platen comprises the document table on which the document is placed, a first mirror that reflects the image luminous flux of the document placed on the document table, a second mirror that reflects the image luminous flux from the first mirror, and a camera that captures the image luminous flux from the second mirror. Further, the platen is provided with a protective cover having a shape along the image luminous flux in an aperture portion formed on the document table for passing the image luminous flux from the first mirror to the second mirror.

SUMMARY

In the related art, in a case where brightness correction such as shading correction is performed on a document image, even in a case where external light such as sunlight or illumination light is incident on only a part of an installation area of the document, the entire document image is a target of the correction. Thus, there is a problem that a relatively long time is needed to perform the brightness correction.

Aspects of non-limiting embodiments of the present disclosure relate to an information processing apparatus, a non-transitory computer readable medium storing an information processing program, and an information processing method capable of performing brightness correction in a shorter time as compared with a case where the brightness correction is performed on an entire document image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform brightness correction with an image area that satisfies a predetermined condition in a document image of a captured image of an installation area where a document is installed, as a processing target area.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present disclosure will be described in detail with reference to drawings. In the present exemplary embodiment, an example of a form in a case where an information processing apparatus of the technique of the present disclosure is applied to an image forming apparatus provided in an office and having a document camera as a target will be described. However, the application target of the technique of the present disclosure is not limited to an office. Any place where the image forming apparatus can be installed, such as a store, a school, or a home, can be the application target thereof. The application target of the technique of the present disclosure is not limited to the image forming apparatus, and any apparatus in which external light such as sunlight may be input to an image obtained by capturing with a camera can be the application target thereof, for example, a computer such as a notebook type personal computer or a tablet type computer or an information terminal such as a mobile phone.

Figures 1, 2:
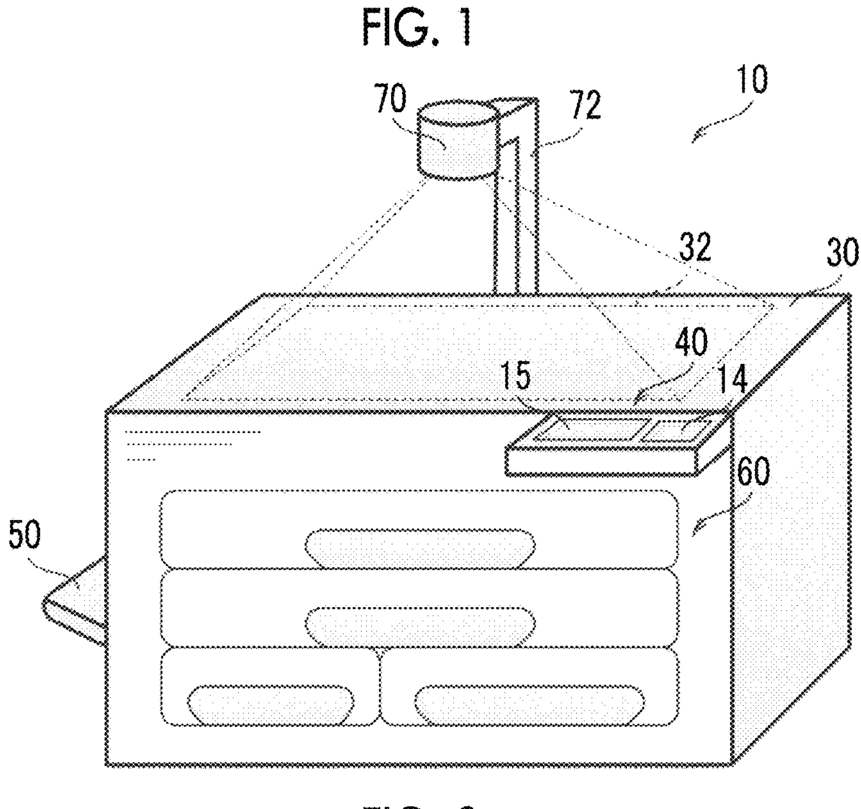
FIG. 1 is a perspective view of an example of an overall configuration of an image forming apparatus according to an exemplary embodiment.
FIG. 2 is a block diagram showing an example of a hardware configuration of an electric system of the image forming apparatus according to the exemplary embodiment.

First, a configuration of an image forming apparatus 10 according to the present exemplary embodiment will be described with reference to FIG. 1. FIG. 1 is a perspective view of an example of an overall configuration of the image forming apparatus 10 according to the present exemplary embodiment.

As shown in FIG. 1, the image forming apparatus 10 according to the present exemplary embodiment comprises a document table 30 on which a document is placed on an upper surface, a user interface unit (hereinafter, referred to as "UI unit") 40 that performs display of various types of information and an input of various types of information, a tray 50 for discharging paper on which an image is formed, and a paper feeding unit 60 that feeds various types of paper.

The image forming apparatus 10 according to the present exemplary embodiment is provided with a document camera 70 configured such that an upper surface side of the document table 30 can be imaged. The document camera 70 according to the present exemplary embodiment is provided at the other end portion of an arm 72 whose one end portion of which is fixed to a back side of the document table 30, and is positioned such that an imaging angle of view of the document camera 70 substantially matches a document disposition area 32 in the document table 30.

In the present exemplary embodiment, a camera that captures a color moving image is applied as the document camera 70, but the present disclosure is not limited thereto. For example, a camera that captures a monochrome or gray scale moving image may be applied as the document camera 70.

On the other hand, the UI unit 40 according to the present exemplary embodiment comprises an input unit 14 having various switches and a display unit 15 configured by a liquid crystal display or the like. The display unit 15 according to the present exemplary embodiment is configured as a so-called touch panel display in which a touch panel having light transmittance is provided on a surface side of a display.

In the present exemplary embodiment, a digital multi-function device having an image printing function, an image reading function, an image transmission function, and the like is applied as the image forming apparatus 10. However, the present disclosure is not limited to the form. A form may be employed in which another image forming apparatus such as an image forming apparatus having only the image printing function and an image forming apparatus having only the image printing function and the image reading function is applied as the image forming apparatus 10.

Next, a configuration of an electric system of the image forming apparatus 10 according to the present exemplary embodiment will be described with reference to FIG. 2. FIG. 2 is a block diagram showing an example of a hardware configuration of the electric system of the image forming apparatus 10 according to the present exemplary embodiment.

As shown in FIG. 2, the image forming apparatus 10 according to the present exemplary embodiment comprises a central processing unit (CPU) 11 as a processor, a memory 12 as a temporary storage area, a non-volatile storage unit 13, and the UI unit 40 including the input unit 14 and the display unit 15 described above. Further, the image forming apparatus 10 according to the present exemplary embodiment comprises a medium reading and writing apparatus (R/W) 16, a communication interface (I/F) unit 18, and the above document camera 70. The CPU 11, the memory 12, the storage unit 13, the UI unit 40, the medium reading and writing apparatus 16, the communication OF unit 18, and the document camera 70 are connected to each other via a bus B. The medium reading and writing apparatus 16 reads out information written on a recording medium 17 and writes information on the recording medium 17.

The storage unit 13 according to the present exemplary embodiment is realized by a hard disk drive (HDD), a solid state drive (SSD), a flash memory, or the like. An information processing program 13A is stored in the storage unit 13 as a storage medium. The recording medium 17 on which the information processing program 13A is written is connected to the medium reading and writing apparatus 16, and the medium reading and writing apparatus 16 reads out the information processing program 13A from the recording medium 17 to store (install) the information processing program 13A in the storage unit 13. The CPU 11 reads out the information processing program 13A from the storage unit 13, expands the information processing program 13A into the memory 12, and sequentially executes processes included in the information processing program 13A.

Needless to say, the image forming apparatus 10 is provided with apparatuses related to image processing such as an image forming engine and an image reading apparatus, although not illustrated.

Figure 3:
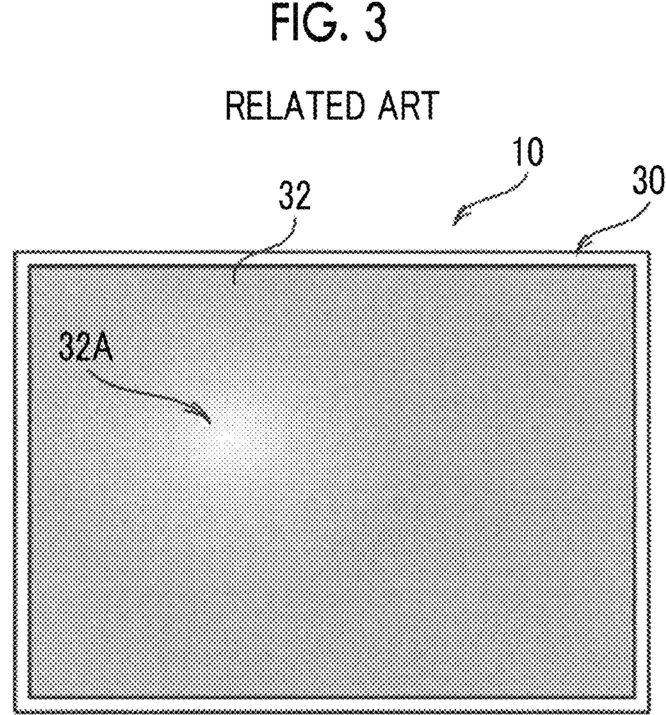
FIG. 3 is a diagram provided for describing a problem in the related art, and is a plan view of an example of an influence of illumination in a room.

Next, a problem in the related art will be described with reference to FIGS. 3 and 4. FIG. 3 is a diagram provided for describing the problem in the related art, and is a plan view of an example of an influence of illumination in a room. Further, FIG. 4 is a diagram provided for describing the problem in the related art, and is a plan view of an example of an influence of direct sunlight.

As shown in FIG. 3 as an example, in a case where sunlight is not incident on the document disposition area 32 of the document table 30, which is within the imaging angle of view by the document camera 70, the influence of the illumination occurs on a partial area 32A of the document disposition area 32 by the illumination in a room. In this case, illumination light has a lower luminance than sunlight, and the brightness changes stepwise in the partial area 32A. Thus, an influence on an image obtained by imaging with the document camera 70 (hereinafter, referred to as "captured image") is limited.

Figure 4:
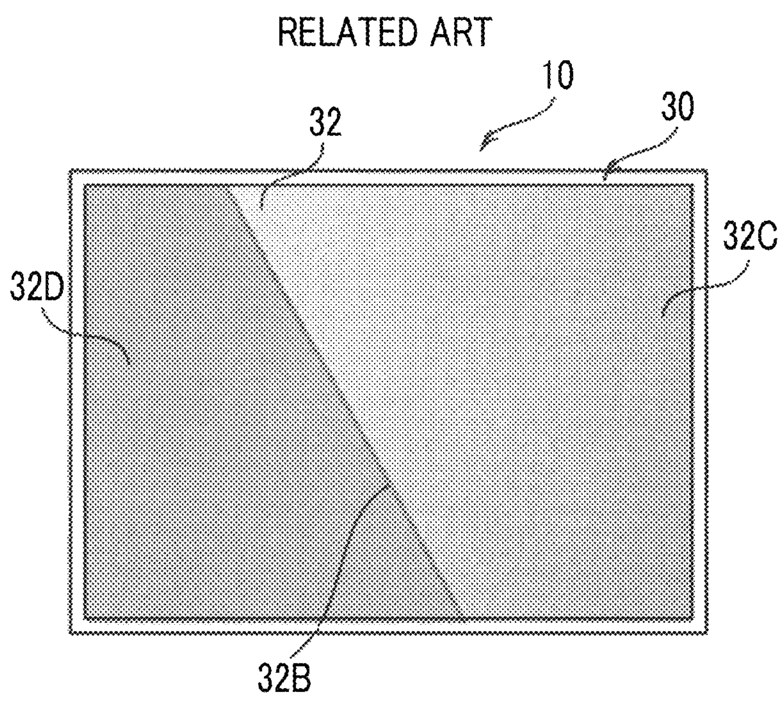
FIG. 4 is a diagram provided for describing a problem in the related art, and is a plan view of an example of an influence of direct sunlight.

On the contrary, as shown in FIG. 4 as an example, in a case where sunlight is incident on the document disposition area 32, the luminance is extremely different between a bright area 32C and the other area 32D across a linear boundary portion 32B corresponding to a portion along a window frame that is a boundary between indoor and outdoor areas. As a result, there is a problem that unevenness in a light amount having a large step occurs in the captured image.

This problem is likely to occur in an image forming apparatus having a document camera that does not have an automatic document feeding apparatus or a document holding plate, such as the image forming apparatus 10 according to the present exemplary embodiment.

On the other hand, in order to suppress the unevenness in the light amount in an image, brightness correction such as shading correction has been performed in the related art. In a case where the image forming apparatus 10 is provided with the automatic document feeding apparatus or the document holding plate, an imaging unit provided in the apparatus continuously scans line data in a main scanning direction to generate image information for one surface. In this case, in a case where the brightness correction is performed, usually, the brightness correction is performed at the same time as the acquisition of the line data in the main scanning direction, and thus the brightness correction can be ended at the same time as the generation of the image information for one surface.

On the contrary, since the document camera scans in a surface unit, the brightness correction in parallel with scanning in a line unit in the related art cannot be applied. Further, for the captured image obtained by imaging with the document camera, in order to improve convenience, scanning in real time and display of a preview image are requested before image formation or the like is performed.

Therefore, in the image forming apparatus having the document camera, the brightness correction needs to be performed while maintaining a high throughput.

In the image forming apparatus 10 according to the present exemplary embodiment, the brightness correction is collectively performed on the captured image obtained by imaging with the document camera 70 by focusing on only an area affected by sunlight.

Figure 5:
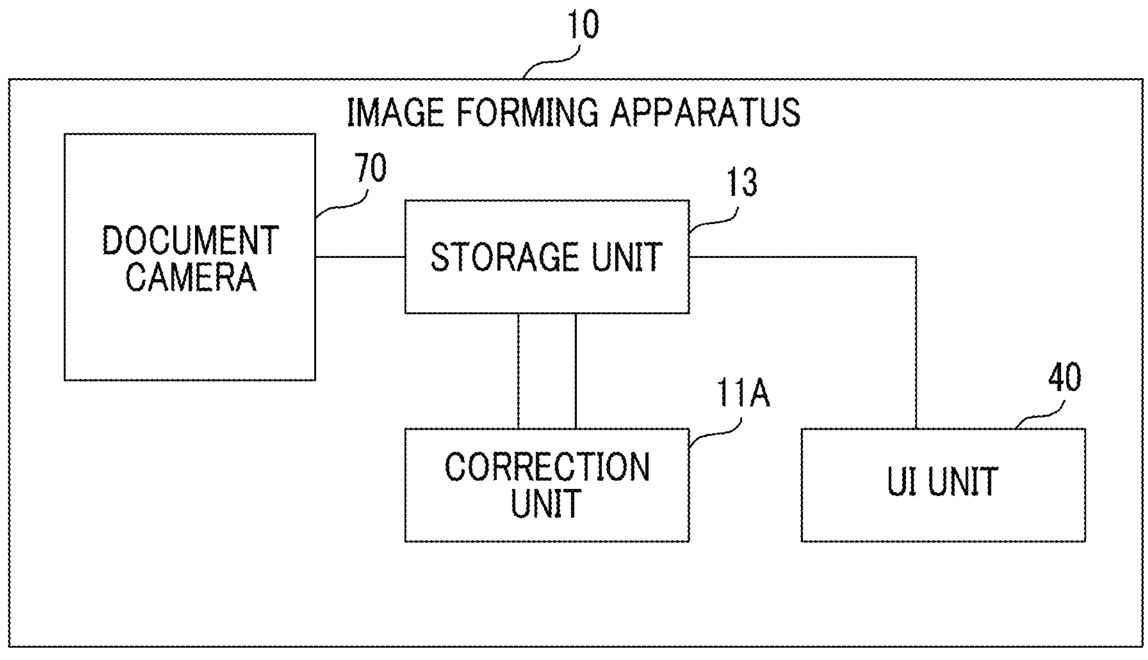
FIG. 5 is a block diagram showing an example of a functional configuration of the image forming apparatus according to the exemplary embodiment.

Next, a functional configuration of the image forming apparatus 10 according to the present exemplary embodiment will be described with reference to FIG. 5. FIG. 5 is a block diagram showing an example of the functional configuration of the image forming apparatus 10 according to the present exemplary embodiment.

As shown in FIG. 5, the image forming apparatus 10 according to the present exemplary embodiment includes a correction unit 11A. The CPU 11 of the image forming apparatus 10 executes the information processing program 13A to function as the correction unit 11A.

The correction unit 11A according to the present exemplary embodiment performs the brightness correction with an image area that satisfies a predetermined condition in a document image of the captured image of an installation area (the document disposition area 32 in the present exemplary embodiment) where the document is installed, as a processing target area. In the present exemplary embodiment, the shading correction is applied as the brightness correction by the correction unit 11A, but the present disclosure is not limited thereto. For example, a form may be employed in which correction for uniformly reducing a luminance value of the area affected by sunlight in the captured image by a predetermined value is applied as the brightness correction. Further, in the present exemplary embodiment, a condition that a difference in brightness at a boundary position with another image area is equal to or larger than a predetermined threshold value is applied as the predetermined condition. However, the present disclosure is not limited thereto. For example, a form may be employed in which a condition of being brighter than a predetermined threshold value is applied as the predetermined condition.

As the above-mentioned threshold value, a value obtained in advance by an experiment using an actual machine, computer simulation using a design specification of the actual machine, a condition of an environment in which the actual machine is provided, and the like, or the like can be applied as a value that can distinguish the area affected by sunlight from another area, by applying the threshold value.

The correction unit 11A according to the present exemplary embodiment sets, as the processing target area, an area surrounded by a boundary portion in which the brightness of the installation area in the captured image is switched under the predetermined condition (the threshold value or higher in the present exemplary embodiment) and an outer peripheral portion in the installation area, which is an area of the document image included in an area on a bright side.

The correction unit 11A according to the present exemplary embodiment performs the brightness correction by using a difference between the brightness of an area excluding the area on the bright side on an installation surface of the document in the installation area and the brightness of the area on the bright side.

In particular, in a case where the captured image is a color image, the correction unit 11A according to the present exemplary embodiment performs the brightness correction by using a color difference between the area excluding the area on the bright side on the installation surface of the document in the installation area and the area on the bright side.

Further, the correction unit 11A according to the present exemplary embodiment collectively performs the brightness correction on the processing target area in the captured image obtained by the document camera 70. This is because the scanning is performed in surface unit in the document camera, as described above.

Figure 6:
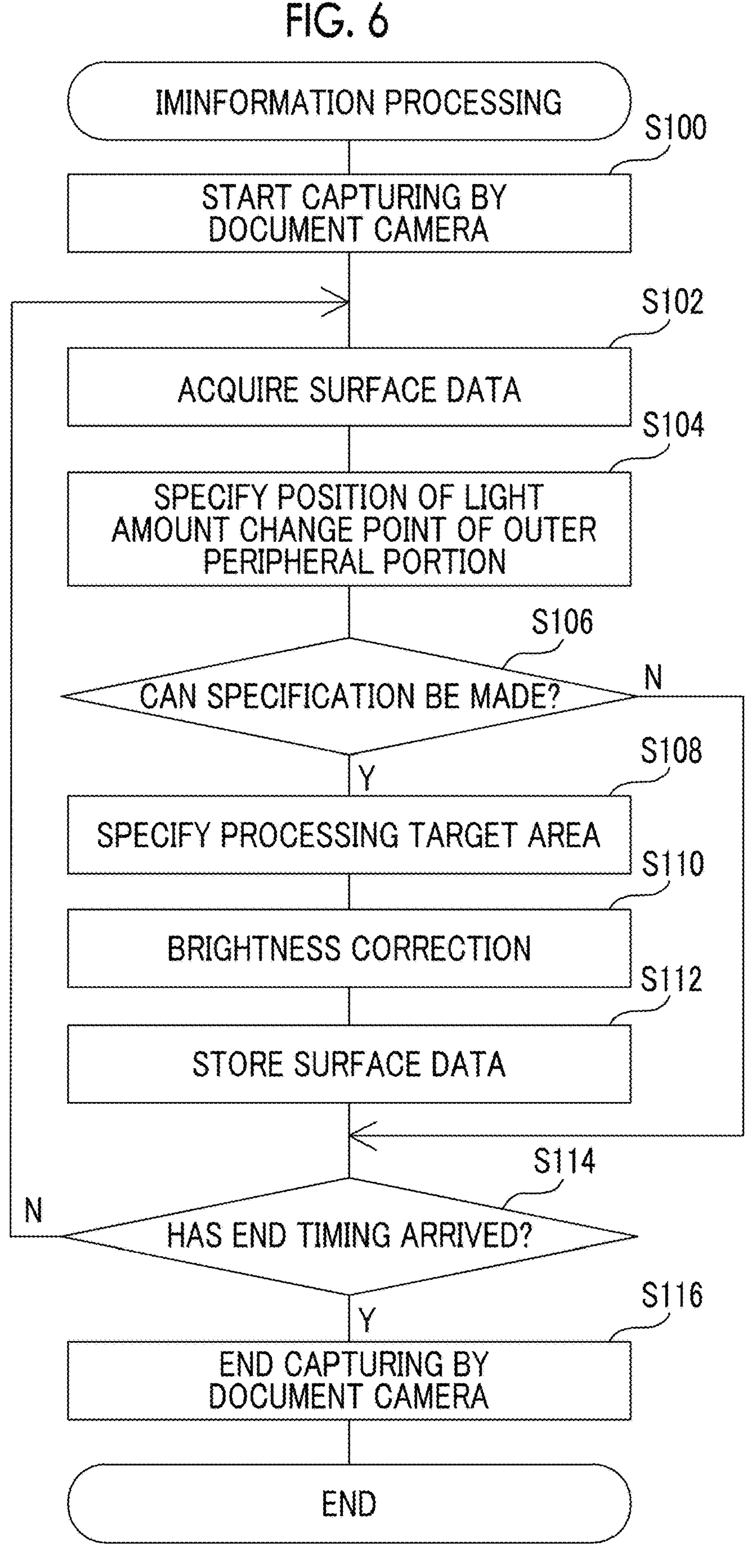
FIG. 6 is a flowchart showing an example of information processing according to the exemplary embodiment.
Figure 7:
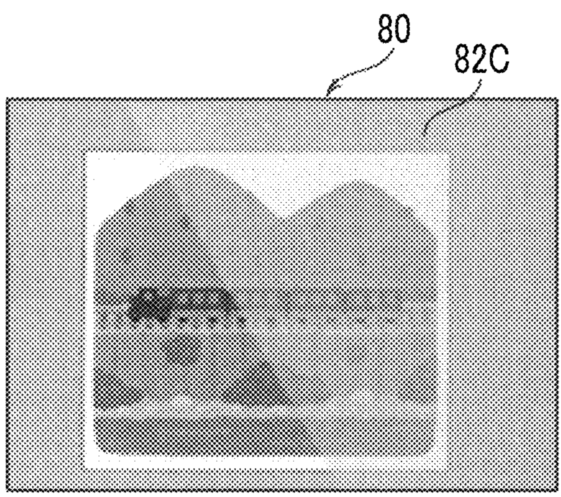
FIG. 7 is a diagram for describing the information processing according to the exemplary embodiment, and is a diagram showing an example of a captured image in a case where direct sunlight is incident within an imaging angle of view by a document camera.

Next, an action of the image forming apparatus 10 according to the present exemplary embodiment in a case where information processing is executed will be described with reference to FIGS. 6 to 8. FIG. 6 is a flowchart showing an example of the information processing according to the present exemplary embodiment.

In a case where a user places the document on the document disposition area 32 of the document table 30 and then issues an instruction to execute the information processing via the UI unit 40, the CPU 11 of the image forming apparatus 10 executes the information processing program 13A to execute the information processing shown in FIG. 6.

In Step S100 of FIG. 6, the CPU 11 transmits an instruction to cause the document camera 70 to start capturing the moving image. In response to the instruction, the document camera 70 starts capturing the moving image and starts storing the image information indicating the captured image in a predetermined storage area in the storage unit 13.

In Step S102, the CPU 11 reads out the image information for one surface stored in the storage unit 13. As shown in FIG. 7 as an example, a captured image 80 indicated by the image information read out here may include a bright area 82C due to sunlight. FIG. 7 is a diagram provided for describing the information processing according to the present exemplary embodiment, and is a diagram showing an example of the captured image in a case where the direct sunlight is incident within the imaging angle of view by the document camera 70.

Figure 8:
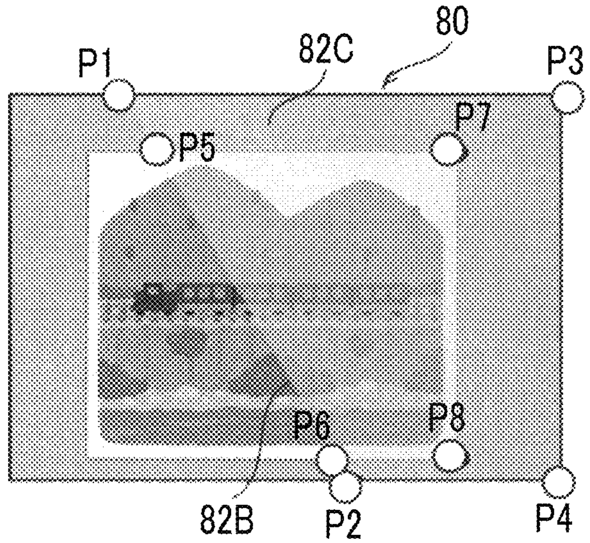
FIG. 8 is a diagram for describing the information processing according to the exemplary embodiment, and is a diagram for describing a method of deriving an area to be a target of brightness correction.

In Step S104, as shown in FIG. 8 as an example, the CPU 11 attempts specification of a point P1 and a point P2 at which the brightness of the outer peripheral portion of the captured image 80 changes under the predetermined condition (the threshold value or higher in the present exemplary embodiment). FIG. 8 is a diagram provided for describing the information processing according to the present exemplary embodiment, and is a diagram for describing a method of deriving an area to be a target of the brightness correction.

In the captured image 80 shown in FIG. 8 as an example, since sunlight is incident, the point P1 and the point P2 can be specified. However, in a case where sunlight is not incident, the two points P1 and P2 cannot be specified.

In Step S106, the CPU 11 determines whether or not the two points P1 and P2 can be specified. In a case where negative determination is made, the processing proceeds to Step S114, while positive determination is made, the processing proceeds to Step S108.

In Step S108, the CPU 11 specifies the processing target area, which is an area on which the brightness correction is performed, as shown below, using the specified points P1 and P2.

First, the CPU 11 connects the two points of the point P1 and the point P2 with a straight line to specify a boundary portion 82B.

Next, the CPU 11 specifies, as the processing target area, an area surrounded by the boundary portion 82B and the outer peripheral portion in the captured image, which is an area (surrounded by points P5, P6, P7, and P8 in the example shown in FIG. 8) of the document image included in an area (surrounded by points P1, P2, P3, and P4 in the example shown in FIG. 8) on a bright side. The area of the document image can be specified by detecting the boundary position between a color of a surface on which the document is placed in the document disposition area 32 of the document table 30 and another color. However, needless to say, a method of specifying the area of the document image is not limited to the method.

In Step S110, the CPU 11 executes the brightness correction with the specified processing target area as a target. In the present exemplary embodiment, as the brightness correction, processing of subtracting the color difference (distance) between a normal area of the installation surface of the document and the bright area 82C from a pixel value of the processing target area is applied. However, the present disclosure is not limited thereto. For example, a form may be employed in which processing of subtracting a difference value between the brightness of the normal area of the installation surface of the document and the brightness of the bright area 82C from the pixel value of the processing target area is applied as the brightness correction.

In Step S112, the CPU 11 stores the image information subjected to the above brightness correction in the storage area of the storage unit 13 of the image information read out in the processing of Step S102. With the processing, the image information stored in the storage unit 13 is used to display the above preview image on the display unit 15.

In Step S114, the CPU 11 determines whether or not a predetermined end timing has arrived as a timing for ending the present information processing. In a case where negative determination is made, the processing returns to Step S102, while positive determination is made, the processing proceeds to Step S116. In the present exemplary embodiment, as the end timing, a timing at which the user issues an instruction to end the information processing via the UI unit 40 is applied. However, needless to say, the present disclosure is not limited thereto.

In Step S116, the CPU 11 transmits an instruction to cause the document camera 70 to stop the capturing of the moving image and then ends the present information processing. In response to the instruction, the document camera 70 stops capturing the moving image.

Figure 9:
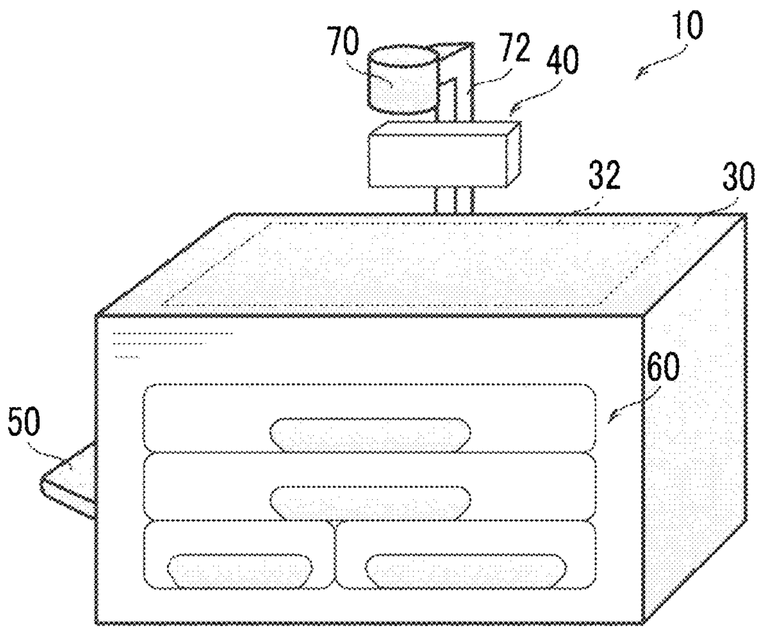
FIG. 9 is a perspective view of an example of an overall configuration of an image forming apparatus according to another exemplary embodiment.

In the above exemplary embodiment, a case has been described in which the technique of the present disclosure is applied to the image forming apparatus 10 in which the UI unit 40 is provided on a front surface side of the apparatus, shown in FIG. 1 as an example. However, the present disclosure is not limited thereto. For example, a form may be employed in which the technique of the present disclosure is applied to the image forming apparatus 10 in which the UI unit 40 is provided on a rear surface side (the arm 72 of the document camera 70 in the example shown in FIG. 10) of the apparatus, shown in FIG. 9 as an example.

Although the exemplary embodiment has been described above, the technical scope of the present invention is not limited to the scope described in the above exemplary embodiment. Various changes or improvements can be made to the exemplary embodiment without departing from the gist of the invention, and the modified or improved form is also included in the technical scope of the present invention.

The above exemplary embodiment does not limit the invention according to the claim, and not all combinations of features described in the exemplary embodiment are requested for a solution of the invention. The above exemplary embodiments include inventions at various stages, and various inventions are extracted by combining a plurality of disclosed constituent elements. Even though some constituent elements are deleted from all the constituent elements shown in the exemplary embodiment, as long as an effect is obtained, a configuration in which some constituent elements are deleted can be extracted as an invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, a case has been described in which the information processing is realized by executing a program with a software configuration using a computer. However, the present invention is not limited thereto. For example, the information processing may be realized by a hardware configuration or a combination of a hardware configuration and a software configuration.

In addition, the configuration of the image forming apparatus 10 described in the above exemplary embodiment is an example, and, needless to say, an unnecessary portion may be deleted or a new portion may be added within a range that does not deviate from the gist of the present invention.

The flow of information processing described in the above exemplary embodiment is also an example, and, needless to say, an unnecessary step may be deleted, a new step may be added, or the processing order may be changed within a range that does not deviate from the gist of the present invention.

Supplementary Note (((1)))

An information processing apparatus comprising:

a processor configured to:

perform brightness correction with an image area that satisfies a predetermined condition in a document image of a captured image of an installation area where a document is installed, as a processing target area.

(((2)))

The information processing apparatus according to (((1))), wherein the processor is configured to:

set, as the processing target area, an area surrounded by a boundary portion in which brightness of the installation area in the captured image is switched under a predetermined condition and an outer peripheral portion in the installation area, which is an area of the document image included in an area on a bright side.

(((3)))

The information processing apparatus according to (((2))), wherein the processor is configured to:

use a difference between brightness of an area excluding the area on the bright side of an installation surface of the document in the installation area and brightness of the area on the bright side to perform the brightness correction.

(((4)))

The information processing apparatus according to (((3))), wherein the processor is configured to:

in a case where the captured image is a color image, use a color difference between the area excluding the area on the bright side of the installation surface of the document in the installation area and the area on the bright side to perform the brightness correction.

(((5)))

The information processing apparatus according to any one of (((1))) to (((4))), wherein the captured image is a captured image obtained by imaging the installation area where a document holding plate is not used.

(((6)))

The information processing apparatus according to (((5))), wherein the captured image is a captured image obtained by a document camera.

(((7)))

The information processing apparatus according to (((6))), wherein the processor is configured to:

perform the brightness correction collectively on the processing target area in the captured image obtained by the document camera.

(((8)))

The information processing apparatus according to any one of (((2))) to (((4))), wherein brightness on the bright side is due to sunlight.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

perform brightness correction with an image area that satisfies a predetermined condition in a document image of a captured image of an installation area where a document is installed, as a processing target area; and set, as the processing target area, an area surrounded by a boundary portion in which brightness of the installation area in the captured image is switched under a predetermined condition and an outer peripheral portion in the installation area, which is an area of the document image included in an area on a bright side.

2. The information processing apparatus according to claim 1, wherein the processor is configured to:

use a difference between brightness of an area excluding the area on the bright side of an installation surface of the document in the installation area and brightness of the area on the bright side to perform the brightness correction.

3. The information processing apparatus according to claim 2, wherein the processor is configured to:

in a case where the captured image is a color image, use a color difference between the area excluding the area on the bright side of the installation surface of the document in the installation area and the area on the bright side to perform the brightness correction.

4. The information processing apparatus according to claim 1, wherein the captured image is a captured image obtained by imaging the installation area where a document holding plate is not used.

5. The information processing apparatus according to claim 4, wherein the captured image is a captured image obtained by a document camera.

6. The information processing apparatus according to claim 5, wherein the processor is configured to:

perform the brightness correction collectively on the processing target area in the captured image obtained by the document camera.

7. The information processing apparatus according to claim 1, wherein brightness on the bright side is due to sunlight.

8. The information processing apparatus according to claim 2, wherein brightness on the bright side is due to sunlight.

9. The information processing apparatus according to claim 3, wherein brightness on the bright side is due to sunlight.

10. A non-transitory computer readable medium storing an information processing program causing a computer to execute a process comprising:

performing brightness correction with an image area that satisfies a predetermined condition in a document image of a captured image of an installation area where a document is installed, as a processing target area; and setting, as the processing target area, an area surrounded by a boundary portion in which brightness of the installation area in the captured image is switched under a predetermined condition and an outer peripheral portion in the installation area, which is an area of the document image included in an area on a bright side.

11. An information processing method comprising:

performing brightness correction with an image area that satisfies a predetermined condition in a document image of a captured image of an installation area where a document is installed, as a processing target area; and setting, as the processing target area, an area surrounded by a boundary portion in which brightness of the installation area in the captured image is switched under a predetermined condition and an outer peripheral portion in the installation area, which is an area of the document image included in an area on a bright side.

* * * * *